United States Patent
Rodelas et al.

(10) Patent No.: US 12,115,596 B2
(45) Date of Patent: Oct. 15, 2024

(54) METHODS FOR SITE-SPECIFIC ENHANCEMENT OF SOFT MAGNETIC ALLOYS

(71) Applicant: National Technology & Engineering Solutions of Sandia, LLC, Albuquerque, NM (US)

(72) Inventors: Jeffrey Rodelas, Albuquerque, NM (US); Donald F. Susan, Albuquerque, NM (US); Andrew Kustas, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 173 days.

(21) Appl. No.: 17/157,550

(22) Filed: Jan. 25, 2021

(65) Prior Publication Data
US 2021/0229217 A1    Jul. 29, 2021

Related U.S. Application Data

(60) Provisional application No. 62/966,254, filed on Jan. 27, 2020.

(51) Int. Cl.
| | | |
|---|---|---|
| *B23K 26/323* | (2014.01) | |
| *B23K 15/00* | (2006.01) | |
| *B23K 26/24* | (2014.01) | |
| *B23K 26/354* | (2014.01) | |
| *B23K 103/18* | (2006.01) | |
| *B32B 15/01* | (2006.01) | |
| *C22F 3/02* | (2006.01) | |

(Continued)

(52) U.S. Cl.
CPC ........ *B23K 26/323* (2015.10); *B23K 15/0046* (2013.01); *B23K 26/24* (2013.01); *B23K 26/354* (2015.10); *B32B 15/011* (2013.01); *C22F 3/02* (2013.01); *H01F 1/147* (2013.01); *H01F 41/02* (2013.01); *B23K 2103/18* (2018.08)

(58) Field of Classification Search
CPC ................ B23K 26/354; B23K 26/323; B23K 15/0046; B23K 26/24; B23K 2103/18; B32B 15/011; C22F 3/02; H01F 1/147; H01F 41/02
USPC ...................................................... 219/121.11
See application file for complete search history.

(56) References Cited

U.S. PATENT DOCUMENTS

| | | | | |
|---|---|---|---|---|
| 2,209,685 A | * | 7/1940 | Crafts ..................... | C22C 38/02 148/307 |
| 5,242,760 A | * | 9/1993 | Matsuoka ........... | H01F 1/15341 428/812 |

(Continued)

OTHER PUBLICATIONS

Kustas, Andrew B., et al. "Characterization of the Fe—Co—1.5 V soft ferromagnetic alloy processed by Laser Engineered Net Shaping (LENS)." Additive Manufacturing 21 (2018): 41-52. (Year: 2018).*

(Continued)

*Primary Examiner* — Janie M Loeppke
*Assistant Examiner* — Simpson A Chen
(74) *Attorney, Agent, or Firm* — Kevin W. Bieg; Helen S. Baca

(57) ABSTRACT

The present invention relates to methods of enhancing the surface properties of soft alloys by using a high energy beam. In particular embodiments, the methods can also allow for beam-based welding of such soft alloys to another metal component.

14 Claims, 11 Drawing Sheets

(51) Int. Cl.
H01F 1/147 (2006.01)
H01F 41/02 (2006.01)

(56) References Cited

U.S. PATENT DOCUMENTS

| | | | |
|---|---|---|---|
| 5,483,037 A | 1/1996 | Giedt et al. | |
| 7,348,568 B2 | 3/2008 | Elmer et al. | |
| 8,766,136 B2 | 7/2014 | Kessler et al. | |
| 10,189,114 B2 | 1/2019 | Stecker | |
| 10,571,835 B2 | 8/2020 | Grapov et al. | |
| 10,906,129 B2 | 2/2021 | Scherbakov et al. | |
| 11,427,902 B2* | 8/2022 | Kang | C21D 6/002 |
| 2006/0192144 A1 | 8/2006 | Schubert et al. | |
| 2006/0196853 A1 | 9/2006 | Elmer et al. | |
| 2011/0007433 A1* | 1/2011 | Pyrhonen | H02M 1/44 361/18 |
| 2015/0248957 A1* | 9/2015 | Takajo | C21D 8/1294 148/112 |
| 2016/0035474 A1* | 2/2016 | Azuma | B23K 26/361 29/605 |
| 2016/0307678 A1* | 10/2016 | Unosson | B33Y 40/00 |
| 2018/0119241 A1 | 5/2018 | Susan et al. | |
| 2019/0321920 A1* | 10/2019 | Kwon | C21D 10/00 |
| 2020/0362431 A1* | 11/2020 | Takahashi | B23K 26/08 |
| 2021/0130922 A1* | 5/2021 | Kwon | C21D 10/005 |
| 2021/0178481 A1* | 6/2021 | Walrand | B22F 12/90 |

OTHER PUBLICATIONS

Yang, Xiaoshan, et al. "Soft magnetic property of (Fe60Co35Ni5) 78 Si6B12Cu1Mo3 alloys by laser additive manufacturing." Journal of Magnetism and Magnetic Materials 466 (2018): 75-80. (Year: 2018).*
Garibaldi, M., et al. "Effect of annealing on the microstructure and magnetic properties of soft magnetic Fe—Si produced via laser additive manufacturing." Scripta Materialia 142 (2018): 121-125. (Year: 2018).*
YLS-3000 Product Specifications "https://www.gophotonics.com/products/lasers/ipg-photonics/29-152-yls-3000" (Year: 2021).*
Kim, K. N., et al. "The effect of boron content on the processing for Fe-6.5 wt% Si electrical steel sheets." Journal of Magnetism and Magnetic Materials 277.3 (2004): 331-336. (Year: 2004).*
Ziegler, Marco, et al. "Potentials of process monitoring during laser welding of electrical steel laminations." 2019 9th International Electric Drives Production Conference (EDPC). IEEE, 2019. (Year: 2019).*
Kautz, D. D. et al., "A Characterization of Pulsed Electron Beam Welding Parameters," Welding Research Supplement, 1991, pp. 100-105.
Magnabosco, I. et al., "An Investigation of Fusion Zone Microstructures in Electron Beam Welding of Copper—Stainless Steel," Materials Science and Engineering A, 2006, vol. 424, pp. 163-173.
Yunlian, Q. et al., "Electron Beam Welding, Laser Beam Welding and Gas Tungsten Arc Welding of Titanium Sheet," Materials Science and Engineering A, 2000, vol. 280, pp. 177-181.
Chu, D. et al., "Recent Progress in High Bs and Low Hc Fe-Based Nanocrystalline Alloys," Nanotechnology Review, 2014, vol. 3, pp. 153-159.
Ebrahimzadeh, H. et al., "Investigation on Pulsed Nd:YAG Laser Welding of 49Ni—Fe Soft Magnetic Alloy," Materials and Design, 2012, vol. 38, pp. 115-123.

Hasegawua, R., "Design and Fabrication of New Soft Magnetic Materials," Journal of Non-Crystalline Solids, 2003, vol. 329, pp. 1-7.
Inoue, A., "Bulk Amorphous Alloys With Soft and Hard Magnetic Properties," Materials Science and Engineering, 1997, vol. A226-228, pp. 357-363.
Lashgari, H. R. et al., "Composition Dependence of the Microstructure and Soft Magnetic Properties of Fe-Based Amorphous/Nanocrystalline Alloys: A Review Study," Journal of Non-Crystalline Solids, 2014, vol. 391, pp. 61-82.
Liu, T. et al., "Compositional design and crystallization mechanism of High Bs nanocrystalline alloys," Materials Research Bulletin, 2019, vol. 112, pp. 323-330.
Nabialek, M., "Soft Magnetic and Microstructural Investigation in Fe-Based Amorphous Alloy," Journal of Alloys and Compounds, 2015, vol. 642, pp. 98-103.
Ohta, M. and Yoshizawa, Y., "Recent progress in high Bs Fe-Based Nanocrystalline Soft Magnetic Alloys," Journal of Physics D—Applied Physics, 2011, vol. 44, 064004., 6 pages.
Parsons, R. et al., "Nano-Crystallisation and Magnetic Softening in Fe—B Binary Alloys Induced by Ultra-Rapid Heating," Journal of Physics D: Applied Physics, 2018, vol. 51, 415001, 11 pages.
Qian, Z., "Development of Fe—B—M (M=Cu, Si, Y) soft magnetic alloys," Master of Engineering Thesis, University of New South Wales, School of Materials Science & Engineering, Aug. 2015, 112 pages.
Sundar, R.S. and Deevi, S.C. "Soft Magnetic FeCo Alloys: Alloy Development, Processing, and Properties," International Materials Reviews, 2005, vol. 50, pp. 157-192.
Susan, D. and Rodelas, J., "Advanced Processing of Fe—Co—2V "Hiperco" Soft Magnetic Alloy," 2019 SAND2019-2484PE, Sandia National Laboratories., 36 pages.
Yoshizawa, Y., "Magnetic Properties and Microstructure of Nanocrystalline Fe-Based Alloys," Materials Science Forum, vol. 307, pp. 51-62.
Sourmail, T. "Near Equiatomic FeCo Alloys: Constitution, Mechanical and Magnetic Properties," Progress in Materials Science, 2005, vol. 50, pp. 816-880.
Susan, D. et al., "ECAE of Hiperco Soft Magnetic Alloy," 2016, SAND2016-10630PE, Sandia National Laboratories, 27 pages.
Susan, D. F. et al., "Equal Channel Angular Extrusion for Bulk Processing of Fe—Co—2V Soft Magnetic Alloys, Part I: Processing and Mechanical Properties," Journal of Materials Research, 2018, vol. 33 ,pp. 2168-2175.
Babuska, T. F. et al., "Achieving High Strength and Ductility in Traditionally Brittle Soft Magnetic Intermetallics via Additive Manufacturing," Acta Materialia, 2019, vol. 180, pp. 149-157.
Kustas, A. B. et al., "Characterization of the Fe—Co—1.5V Soft Ferromagnetic Alloy Processed by Laser Engineered Net Shaping (LENS)," Additive Manufacturing, 2018, vol. 21, pp. 41-52.
Clegg, D. W. and Buckley, R. A., "The Disorder—Order Transformation in Iron-Cobalt-Based Alloys," Metal Science Journal, 1973, vol. 7, pp. 48-54.
IPG Photonics Welding Heads, Brochure (www.ipgphotonics.com), 8 pages.
IPG Photonics Wobble Heads, Brochure (www.ipgphotonics.com), 6 pages.
Single Mode Fiber Lasers for Industrial and Scientific Applications, IPG Photonics, Brochure (www.ipgphotonics.com), 6 pages.

* cited by examiner

METHODS FOR SITE-SPECIFIC ENHANCEMENT OF SOFT MAGNETIC ALLOYS

CROSS-REFERENCE TO RELATED APPLICATION

This application claims the benefit of U.S. Provisional Application No. 62/966,254, filed Jan. 27, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to methods of enhancing the surface properties of soft alloys by using a high energy beam. In particular embodiments, the methods can also allow for beam-based welding of such soft alloys to another metal component.

BACKGROUND OF THE INVENTION

Atomically ordered soft magnetic iron-cobalt-vanadium alloys (e.g., Hiperco®, a registered trademark of CRS Holdings, Inc.) have poor mechanical properties including low ductility (e.g., less than about 5%) and low tensile strength (e.g., less than about 40 ksi) with generally undesirable notch-sensitive fracture behavior. This combination of properties and fracture behavior poses a challenge, e.g., such as for solenoid and actuator designs, which can be subject to demanding mechanical environments.

To date, processing developments for Hiperco® have focused on improving bulk mechanical properties (e.g., severe plastic deformation processing or metal additive manufacturing) at the expense of magnetic performance. Accordingly, there is a need for additional processing techniques to further enhance the properties of such soft alloys without affecting their beneficial intrinsic properties.

SUMMARY OF THE INVENTION

The present invention relates, in part, to surface-specific techniques that alter the outermost layers of a material, such as a soft magnetic alloy. In this way, the interior bulk microstructure can be preserved to maintain its thermally processed, optimized magnetic properties prior to the surface modification process.

In a first aspect, the present invention features a method (e.g., of modifying a surface portion of a component) including: providing a component comprising a soft magnetic alloy (e.g., any described herein); and treating a surface portion of the component with a high energy beam, thereby melting and solidifying the surface portion to provide a treated surface portion. In some embodiments, the soft magnetic alloy comprises iron and cobalt.

In a second aspect, the present invention features a method (e.g., of welding a first component to a second component) including: providing a first component including a soft magnetic alloy (e.g., any described herein) in proximity to a second component including a metal (e.g., including iron, such as stainless steel; or including a soft magnetic alloy, such as any described herein); and welding the first component and second component together by applying a high energy beam to a surface portion of the first component and/or second component. In some embodiments, the soft magnetic alloy comprises iron and cobalt.

In some embodiments, a gap is present between the first component and the second component. In other embodiments, the welding step includes applying the high energy beam or the electron beam within the gap. In particular embodiments, the gap can be a distance of from about 0 μm to about 500 μm.

In some embodiments, the first and second components are in contact at a contact point (e.g., in which the contact point is a point or surface in which the first and second components are touching). In other embodiments, the welding step includes applying the high energy beam or the electron beam at an offset from the contact point. In particular embodiments, the offset can be a distance of from about 0 μm to about 900 μm from the contact point.

In any embodiment herein, the high energy beam can be a laser beam or an electron beam. In other embodiments, the high energy beam can have a power of from about 200 W to about 6000 W, and, preferably from 200 W to about 500 W.

In any embodiment herein, the high energy beam can have a frequency oscillation of from about 250 Hz to about 1 kHz.

In any embodiment herein, the high energy beam can be translated along a wobble path. In particular embodiments, the wobble path has a pattern of a linear line, a figure eight, a counterclockwise circular path, or a clockwise circular path.

In any embodiment herein, the high energy beam can have a wavelength of from about 900 nm to about 1600 nm and, preferably, from 1000 to about 1200 nm.

In any embodiment herein, the high energy beam can have a focused beam size of from about 10 μm to about 200 μm and, preferably, from 20 μm to about 80 μm.

In any embodiment herein, the solidifying step can include cooling at a rate of from about 500° C./sec to about 5000° C./sec.

In any embodiment herein, the treated surface portion can have at least about 80% increase in tensile strain-to-failure, as compared to the surface portion prior to treatment. In some embodiments, the treated surface portion has of from about 80% to about 250% increase in tensile strain-to-failure, as compared to the surface portion prior to treatment.

In any embodiment herein, the treated surface portion can have at least about 30% increase in tensile strength, as compared to the surface portion prior to treatment.

In some embodiments, the treated surface portion can have of from about 30% to about 200% increase in tensile strength, as compared to the surface portion prior to treatment.

Definitions

As used herein, the term "about" means +/−10% of any recited value. As used herein, this term modifies any recited value, range of values, or endpoints of one or more ranges.

By "micro" is meant having at least one dimension that is less than 1 mm and, optionally, equal to or larger than about 1 μm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm but equal to or larger than about 1 nm. For instance, a nanostructure (e.g., any structure described herein) can have a length, width, height, cross-sectional dimension, circumference, radius (e.g., external or internal radius), or diameter that is less than 1 µm but equal to or larger than 1 nm. In other instances, the nanostructure has a dimension that is of from about 1 nm to about 1 µm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

FIG. 1A is a photograph of a surface-modified Hiperco® tensile sample (top) and a unmodified sample (bottom). FIG. 1B is a detail photograph of the appearance of the surface after modification (top) and unmodified (bottom). FIG. 1C is an exemplary schematic of a wobble path method. FIG. 1D is a photograph of an exemplary wobble processing setup for tensile specimens.

FIG. 10A is a photograph of the test sample. FIG. 10B a micrograph showing the surface-modified notch surface, the region of stable crack growth, and the region of unstable crack growth. FIG. 10C is a magnified view of the region indicated as a dashed box in FIG. 10B and labeled with the letter "c". FIG. 10D is a magnified view of the region indicated as a dashed box in FIG. 10B and labeled with the letter "d". FIG. 10E is a magnified view of the region indicated as a dashed box in FIG. 10D.

DETAILED DESCRIPTION OF THE INVENTION

The present invention relates to methods that employ high energy beams to modify soft magnetic alloys. In some instances, the method includes treating a surface of a component formed from such an alloy, thereby providing a surface having enhanced material properties. By controlling the site(s) upon which the laser is applied to the surface, the extent of enhancement can be spatially controlled. In another instance, the method includes welding two components together, in which one component is formed from a soft magnetic alloy.

In particular embodiments, the methods incorporate high-energy beam surface melting, e.g., using either a galvanometrically-controlled laser beam or a scan coil-controlled electron beam. In some embodiments, the laser beam or electron beam is manipulated on the surface of a component (e.g., a workpiece) in a pre-programmed path. The path pattern, pattern size, and/or pattern repetition rate can be controlled in a manner to create an arbitrarily distributed heat source acting on the workpiece. The manipulated beam can then be used in conjunction with CNC motion control to move the workpiece relative to the beam.

Figure 1A:
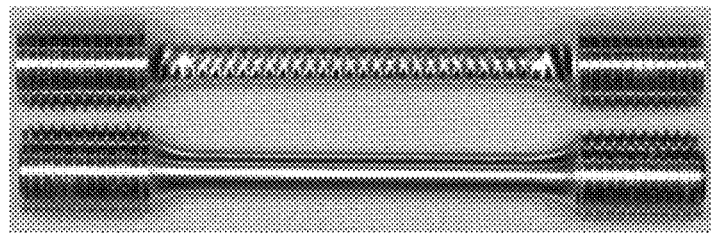
FIGS. 1A-1D shows exemplary methods for high energy beam modification of surfaces, as well as results thereof.
Figure 1B:
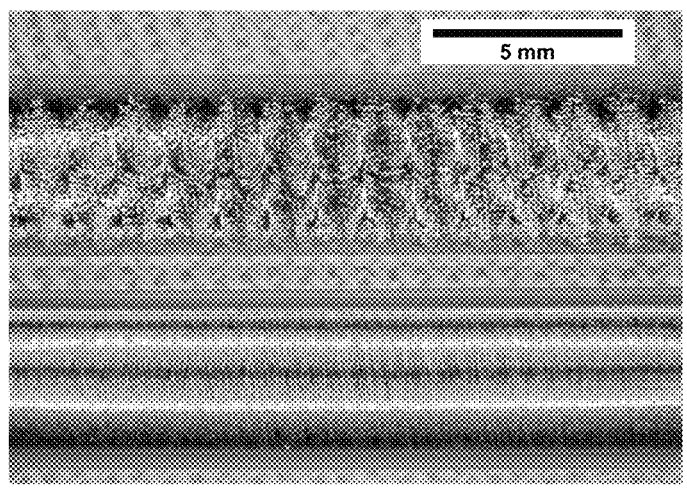
Figure 1C:
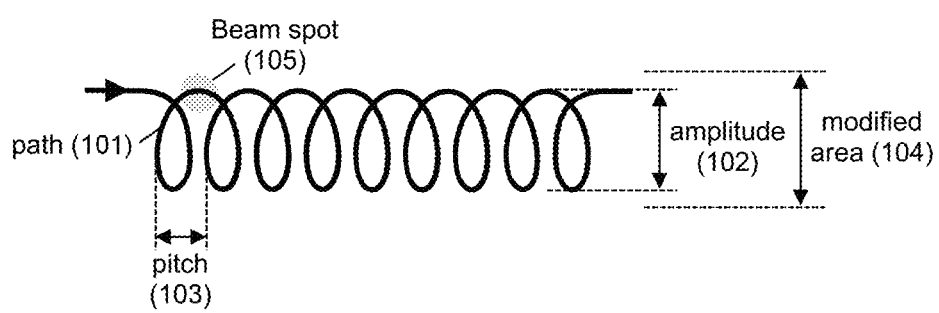

FIG. 1A-1B shows exemplary components or test samples modified by use of a high energy beam. Furthermore, FIG. 1C shows an exemplary method for translating a high energy beam along a path 101. In some embodiments, the high energy beam has a defined spot size 105, which in conjunction with the amplitude 102 of the path defines the modified area 104. The path can have any useful amplitude, such as from about 0.1 mm to 2.0 mm.

The path, in turn, can also be defined by the pattern of repeated unit shape (e.g., a circular path, a figure eight path, a zigzag path, an undulating path, etc.), in which the distance between unit shapes is the pitch 103. The pitch can be of from about 20 µm to about 100 µm. The beam can travel the path at any useful speed, such as from about 0.1 m/min to 10 m/min. Finally, the pattern can be formed from an oscillation of unit shapes to form a pattern, in which the oscillation can be of any useful frequency (e.g. a frequency of from about 200 Hz to 1 kHz, including any ranges disclosed herein).

Various process parameters can then be tailored for the desired application. In one non-limiting instance, a process parameter window can be used to produce a melted layer on the surface of a soft magnetic alloy that rapidly solidifies and cools (e.g., at a rate greater than about 4000° C./s below a critical ordering temperature (e.g., about 720° C. for FeCo-2V)). Without wishing to be limited by mechanism, the rapid solidification afforded by the surface melting process can result in fine, high-angle solidification grains (e.g., less than about 10 µm in size) containing a solidification substructure with a sub-micron cell spacing. These fine grains formed at the surface are expected to be stronger relative to the parent material due to grain boundary (Hall-Petch) strengthening. Such rapid cooling can also preclude the long-range atomic ordering reaction in the processed layer. In another embodiment, laser power can be modified, including a laser power density between from about 9 MW/cm$^2$ to about 21 MW/cm$^2$, in order to promote the formation of fine-grained disordered surface layers increasing proportionally in depth with power density. Exact parameter combinations resulting in mechanical property benefit can exist outside the window evaluated provided rapid cooling is maintained via minimization of linear heat input.

The methods herein can provide site-specific modification of a mechanical property of the treated surface. In one non-limiting instance, evaluation of the tensile fracture behavior of surface-modified Hiperco® has shown up to 100% ductility improvement and 50% tensile strength, as compared to Hiperco® without surface modification. Furthermore, fractographic examination of the tensile samples revealed evidence of microscopic ductile features within the surface-modified region. Without wishing to be limited by mechanism, such treated surfaces can be atomically disordered, as compared to a non-treated surface, which in turn can preclude defect-initiated failure of the soft magnetic alloy and therefore result in a global improvement in mechanical behavior.

The treated surface (including a treated surface portion) can have any useful thickness (e.g. from about 10 μm to about 300 μm), which is generally thinner relative to the cross-section of the bulk portion. The extent and thickness of the treated surface can be optimized in order to not impact the bulk portion of the test sample. For instance and without limitation, the degree to which the fine-grained, disordered surface layer (not optimal for magnetic properties) negatively impacts the part DC magnetic behavior should be negligible. Accordingly, this surface modification offers improved mechanical robustness for advanced components formed from soft magnetic alloys without sacrificing magnetic performance.

High Energy Beams

The present invention relates to methods that employ high energy beams. Exemplary high energy beams include a laser (e.g., a continuous wave laser) beam, an ion beam, or an electron beam (e.g., having a voltage of from about 100 kV to 200 kV; a cathode current of from about 2 to 5 A; a power input of from about 10 kW to about 20 kW; and/or a beam current of from about 50 mA to 200 mA). The electron beam can optionally be conducted under high vacuum. Exemplary high energy beams, as well as systems thereof, are provided in D. D. Kautz et al., "A characterization of pulsed electron beam welding parameters," *Welding Res. Supp.* 1991 April: 100-5; I. Magnabosco et al., *Mater. Sci. Eng. A* 424, 163 (2006); Q. Yunlian et al., *Mater. Sci. Eng.* 280, 177 (2000); U.S. Pat. Nos. 5,483,036, 7,348,568, 8,766,136, and 10,189,114, as well as U.S. Pat. Pub. Nos. 2006/0192144, 2006/0196853, 2016/0368089, and 2018/0147660, each of which is incorporated herein by reference in its entirety.

Soft Magnetic Alloys

The present invention relates to use of soft metal alloys (e.g., a soft magnetic alloy). Exemplary alloys include those having iron (Fe), cobalt (Co), copper (Cu), silicon (Si), aluminum (Al), germanium (Ge), chromium (Cr), manganese (Mn), molybdenum (Mo), tantalum (Ta), nickel (Ni), gallium (Ga), tungsten (W), phosphorus (P), titanium (Ti), vanadium (V), boron (B), niobium (Nb), zirconium (Zr), palladium (Pd), carbon (C), neodymium (Nd), dysprosium (Dy), and/or yttrium (Y), including soft alloys thereof (e.g., Ni-based superalloys), high entropy alloys thereof, aluminides thereof (e.g., titanium aluminide), intermetallics thereof, and/or superalloys thereof. Non-limiting soft magnetic alloys include Fe—Co, Fe—Co—V, Fe—Co—2V, Fe—Co-1.5V, Fe-50Co, Fe—(30-50)Co, Fe—Co—B, Fe—Co—Y—W—B, Fe-3.5% Si, Fe-6% Si, Fe—6.5% Si, Fe—Cr, Fe—Ni, Fe-47% Ni, Fe—Si, Fe—Si—B, Fe—Si—B—Cu, Fe—Si—B—P—Cu, Fe—Si—B—Nb, Fe—Si—B—Nb—Cu, Fe—Si—B—Nb—Cu, Fe—Si—B—P—Cu, Fe—Cu—Nb—Si—B, Fe—B, Fe—B—Nb, Fe—B—Cu, Fe—B—Si, 5 Fe—B—Y, Fe—Cu—B, Fe—B—C—Cu, Fe—Cu—Si—B, Fe—Cu—Nb—Si—B, Fe—Al, Fe—Al—P—C—B, Fe—Al—Ga—P—C—B, Fe—Al—Ga—P—C—B—Si, Fe—Al—Ga—P—B—Si—Cu, Fe—Al—Ge—P—C—B, Fe—Al—Si—Nb—B, Fe—Al—Si—Ni—Zr—B, Fe—P, Fe—Ni—Co—Mn, Fe—Ga—Si—Nb—B, Fe—Ni—Co—Cr—Mn, Fe—Ni—Mn—Ga, Fe—Ni—Co, Fe—Ni—Cu—Mo, Fe29Ni17Co, Fe—Ni—Mo, Fe-78% Ni-4% Mo, Fe—Si—Al, Fe-9.5% Si-5.5% Al, Fe—Zr—B, Fe—Nb—Al—Ga—P—C—B, Fe—Cr—Mo—Ga—P—B—C, Fe—Co—Cr—Nd—Dy—B, Fe—Co—Ni—Zr—Ti—Nb—B, 50Ni/50Fe, 10 400SS, Ni—Cr, Ni—Cu, Co49Fe2V, Fe—Cr—Al—Y, Ni—Cr—Al—Y, Co—Cr—Al—Y, Co—Ni—Cr—Al—Y, Co—Cr—Fe—Mn—Ni, Co—Ni—Mn—Ga, Cr—Al—Y, Fe—Cu—Nb(Si)—B, Fe—Cu—Mo(Si)—B, Fe—Cu—Ta(Si)—B, Fe—Cu—W(Si)—B, Fe—Cu—Zr(Si)—B, Invar36, Ni 625, Ni 713C, Ni 718, Ni 90, H—X, TiAl, 17-4 PH, Pd—Cu—Si, Pd—Cu—Ni—P, or Pd—Ni—P.

Yet other alloys include Ln-Al-TM, Mg-Ln-TM, Zr—Al-TN, Hf—Al-TM, Fe—Cu-TM(Si)—B, Fe-TM-B, Co-TM-C, Fe-TM-N, Fe-TM-B, and Ti—Zr—Al-TM, in which Ln is a lanthanide metal (e.g., lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu)) and TM is a transition metal (e.g., scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), nickel (Ni), palladium (Pd), platinum (Pt), copper (Cu), silver (Ag), or gold (Au)).

Another exemplary alloy can include a high entropy alloy comprising five or more alloying constituents (e.g., five or more metals). Non-limiting high entropy alloys include those having five or more metals selected from the following: aluminum (Al), bismuth (Bi), cobalt (Co), chromium (Cr), copper (Cu), iron (Fe), nickel (Ni), gallium (Ga), manganese (Mn), silicon (Si), and titanium (Ti). Exemplary high entropy alloys include AlCoCrFeNi, AlCoCrCuFeNi, CoCrFeMnNi, FeSiAlNiTi, FeCoNiMnGa (e.g., Fe$_{0.5}$Co$_{0.5}$NiMnGa), FeCoNiMnAl (e.g., FeCoNiMn$_{0.25}$Al$_{0.25}$), FeCoNiAlSi (e.g., FeCoNiAl$_{0.2}$Si$_{0.2}$), and BiFeCoNiMn.

In some embodiments, the method is employed for any alloy or metal having an ordered B2 crystal structure or a DO3 crystal structure. In other embodiments, the method is employed upon a high-silicon content core iron. Yet other alloys and metals include those described in D. Chu et al., *Nanotechnol. Rev.* 3(2), 153 (2014); H. Ebrahimzadeh et al., *Mater. Design* 38, 115 (2012); R. Hasegawa, *J. Non-Crystalline Solids* 329, 1 (2003); A. Inoue, *Mater. Sci. Eng. A* 226-228, 357 (1997); H. R. Lashgari et al., *J. Non-Crystalline Solids* 391, 61 (2014); T. Liu et al., *Mater. Res. Bull.* 112, 323 (2019); M. Nabiałek, *J. Alloys Compounds* 642, 98 (2015); M. Ohta et al., *J. Phys. D Appl. Phys.* 44, 064004 (2011); R. Parsons et al., *J. Phys. D Appl. Phys.* 51, 415001

(2018); Z. Qian, "Development of Fe—B-M (M=Cu, Si, Y) soft magnetic alloys," *Master of Engineering Thesis*, University of New South Wales, School of Materials Science & Engineering, August 2015, 112 pp.; R. S. Sundar et al., *Int'l Mater. Rev.* 50, 157 (2005); D. Susan et al., "Advanced processing of Fe—Co-2V "Hiperco" soft magnetic alloy," *Sandia Report No. SAND*2019-2484*PE,* 2019, 36 pp.; and Y. Yoshizawa, *Mater. Sci. Forum* 307, 61 (1999); each of which is incorporated herein by reference in its entirety.

Metals, Such as Hard Metals

A component can optionally be formed from a soft magnetic alloy or a metal (e.g., a hard metal). Exemplary metals can include iron (Fe), aluminum (Al), nickel (Ni), chromium (Cr), molybdenum (Mo), as well as alloys thereof. Yet other exemplary metals include stainless steel, silicon steel, alloy steel, carbon steel, titanium, tungsten, nickel alloys, etc. Other metals include, e.g., Hastelloy®, Inconel®, Waspaloy®, Rene alloys, Incoloy, MP98T, TMS alloys, and CMSX single crystal alloys.

Components

The methods herein can be applied to any useful component. Exemplary components include, e.g., a solenoid, an actuator, a tape core, a magnetic core, a rotor, a stator, a magnetic bearing, a motor, a generator, as well as parts thereof.

Examples

Example 1: Site-Specific Mechanical Property Enhancement of Soft Magnetic Alloys An autogenous beam melting technique was used to improve the mechanical behavior of atomically ordered iron-cobalt-vanadium alloys (e.g., Hiperco®) by forming a rapidly solidified surface layer (e.g., less than about 200 μm in thickness) composed of fine grains devoid of long-range atomic order. The lack of atomic ordering confined to thin surface layer results in an unaffected interior bulk microstructure that preserves coarse grains and long-range atomic order necessary for optimal magnetic behavior. This modified surface layer technique when applied to tensile test specimens precludes surface-defect nucleated failure and has enhanced ductility (e.g., up to 100% ductility improvement) and enhanced tensility (e.g., up to 50% tensile strength improvement) without bulk degradation of DC magnetic properties compared to unmodified Hiperco®. The surface modification technique can be applied to other brittle-ordered intermetallic alloys to improve mechanical performance, without affecting the interior bulk microstructure.

Example 2: Location-Specific Mechanical Property Enhancement of Soft Magnetic Alloys Intermetallic FeCo—V based soft magnetic alloys are of particular interest in applications for high-performance electromagnetic solenoids, actuators, electric motors, etc., due to their high magnetic permeability, low coercivity, and high saturation magnetization. The composition of nominally 49 wt. % cobalt, 49 wt. % iron, and 2 wt. % vanadium represents an alloy commonly known by its tradename, Hiperco® 50A. This particular alloy has the highest known room-temperature saturation magnetization of any commercial material making it well-suited for volume-limited electromagnetic actuation applications such as aerospace. See T. Sourmail, *Prog. Mater. Sci.* 50(7), 816 (2005).

While possessing advantageous ideal magnetic properties, these intermetallic soft magnetic alloys, including Hiperco®, have characteristically poor strength and poor ductility when compared to conventional soft magnetic alloys (e.g., silicon core iron, or ferritic stainless steels) without long-range atomic order. These mechanical characteristics introduce challenges to electromagnetic component design for demanding mechanical environments. Thus, improving the mechanical behavior of Hiperco® in bar product form has been the focus of several previous studies using the approach of novel thermomechanical processing or alloy composition modification. Traditionally, improvements to the mechanical properties of Hiperco® alloys via bulk material processing and/or alloying addition result in accompanying degradation to the magnetic properties.

Bulk severe plastic deformation of Hiperco® using equal channel angular extrusion (ECAE) was investigated by Susan et al. as a novel thermomechanical processing route. See D. Susan et al., "ECAE of Hiperco soft magnetic alloy," *Sandia Report No. SAND*2016-10630*PE,* 2016 (27 pp.); and D. F. Susan et al., *J. Mater. Res.* 33(15), 2168 (2018). Significant grain refinement of Hiperco® was obtained via ECAE resulting in parent material grains of 25-50 μm reduced to ~1.5 μm after ECAE. Depending on the specific ECAE deformation path, up to a three-fold increase in tensile strength was observed relative to non-ECAE Hiperco® that was subjected to heat treatment to optimize magnetic properties. The significant tensile strength increase as-ECAE'ed was determined to be the result of grain boundary (Hall-Petch) strengthening originating from dynamic recrystallization processes operative during the ECAE process. Ductility in ECAE-processed samples, however, remained comparable to non-ECAE Hiperco® for samples not quenched following ECAE. Moreover, magnetic properties (principally coercivity and maximum relative permeability) were substantially diminished compared to non-ECAE Hiperco®. See D. Susan et al., "ECAE of Hiperco soft magnetic alloy," *Sandia Report No. SAND*2016-10630*PE,* 2016 (27 pp.). Annealing heat treatments used to recover the magnetic properties of ECAE Hiperco® resulted in grain coarsening, which ultimately diminished the strength benefit afforded by ECAE.

A recent study by Babuska et al. has shown fusion-based metal additive manufacturing (AM) methods are able to produce high-strength and ductility in brittle intermetallic alloys including equiatomic FeCo (which is essentially Hiperco® without the addition of vanadium). See T. F. Babuska et al., *Acta Mater.* 180, 149 (2019). Tensile samples produced using powder bed fusion (PBF) AM revealed dramatic improvements to measured tensile properties with yield strengths of ~87 ksi (~600 MPa) and tensile strengths of ~101 ksi (~700 MPa). Most striking were the ductility measurements obtained in this study. Babuska et al. measured strain-to-failure values up 35% with necking and ductile microvoids present on the fracture surface. For comparison, conventional Hiperco® 50A bar typically exhibits ≤5% tensile strain to failure with no measurable necking combined with the fracture surface demonstrating brittle trans/intergranular cleavage fracture. The improvement in tensile mechanical properties for AM FeCo was attributed to the formation of a multi-scale microstructure including a nano-scale solidified sub-grain structure produced by rapid solidification and cooling during the AM PBF process. Missing from this study highlighting the mechanical property benefits afforded via AM is any characterization of magnetic properties.

Based on similar work by Kustas et al. on AM FeCo1.5V produced by directed energy deposition (DED), it is expected that as-AM FeCo subjected to annealing treatments to develop optimal soft magnetic behavior will be obtained at the expense of the tensile property improvements. See A. B. Kustas et al., *Additive Manufact.* 21, 41 (2018). Kustas et al. showed that annealing of FeCo1.5V at 838° C. for 2 hours recovered soft magnetic properties (principally, annealing decreased measured coercivity) and resulted in a heterogenous recrystallization of the as-AM microstructure via abnormal grain growth.

As with ECAE, utilizing AM to improve FeCo alloy tensile properties by microstructural refinement, circumvention of long-range atomic order, and/or formation of multiscale solidification microstructures arrives at the expense of soft magnetic properties. However, the optimal soft magnetic behavior created by isothermal annealing steps to produce coarse, strain-free, atomically-ordered, equiaxed grains erases the unique as-ECAE or as-AM microstructure.

To avoid the conventional magnetic-mechanical property tradeoff associated with bulk modification, the present invention uses alternate material processing techniques to impart location-specific microstructural changes at the part surface. These techniques can improve tensile properties while preserving the bulk microstructure previously processed to optimize magnetic properties. In essence, a high-energy density laser-based surface melting technique is used to impart an AM-like microstructure on the surface of a conventional Hiperco® sample that has been previously thermally processed for optimal magnetic properties.

The feasibility of this approach was evaluated by characterizing Hiperco® tensile mechanical properties, magnetic properties, and microstructure before and after laser surface processing. Using a galvanometrically-driven focused laser beam, the surface of Hiperco® samples was melted and allowed to rapidly solidify. Electron microscopy examination showed that laser surface modified Hiperco® exhibited structural refinement as a result of rapid solidification. More importantly, the laser modified surface was found to result in nearly a 100% increase in tensile strain-to-failure and a 50% increase in tensile strength, as compared to unmodified Hiperco®. Surface modified samples did not exhibit significant changes to the measured DC magnetic properties when compared to unmodified Hiperco®. This technique can improve Hiperco® mechanical robustness while avoiding the associated degradation to magnetic properties caused by bulk processing.

Example 3: Experimental Methods

The same heat treatment of Hiperco® 50A bar investigated as part of a previous work by Robino and Michael was evaluated. See C. V. Robino et al., "Novel ultrafine grain size processing of soft magnetic materials," *Sandia Report No. SAND*2009-0536, 2009 (33 pp.). The reported alloy composition in this work is presented in Table 1. Prior to surface modification, Hiperco® samples were subjected to a conventional annealing heat treatment used for solenoid and actuator parts. The isothermal anneal consisted of a 2-hour heat treatment at 838° C. in vacuum.

TABLE 1

Alloy composition of evaluated Hiperco ® 50A

| Element | Composition (wt. %) Heat 98984 |
|---|---|
| Co | 48.82 |
| V | 1.99 |
| C | 0.002 |
| Mn | 0.08 |
| Si | 0.06 |
| Cr | 0.08 |
| Ni | 0.15 |
| P | 0.006 |
| S | 0.004 |
| O | 0.0030 |
| N | 0.0020 |
| Fe | Balance |

The surface modification of Hiperco® was performed using a 'wobble' laser system originally designed for welding. A wobble laser welding system relies on the principle of rapid oscillation (e.g., up to 1 kHz) of a laser beam with galvanometrically-controlled mirrors to translate a focused beam on the workpiece along a predetermined path. Originally designed for laser welding, the wobble head system enables the development of a distributed laser heat source of arbitrary dimensions without the need to reconfigure the operative lens-collimator combination or workpiece distance with respect to the focal plane. For a wobble system, the spatial characteristics of the effective heat source are tailored by varying the scan frequency, scan amplitude, and/or scan pattern.

A laser welding system (IPG SYS-MA-RD533SA00NCM2, IPG Photonics, Oxford, MA, USA) featuring a 1 kW (+0.5%) fiber laser having a Yb single-mode continuous wave signal (IPG YLR-1000, IPG Photonics, Oxford, MA, USA) and a wobble processing head (IPG FLW-D30, IPG Photonics, Oxford, MA, USA) with a 100 mm collimator and 200 mm final focus lens was used for the surface modification trials. The combination of laser feed fiber diameter, 100 mm collimator, and 200 mm final focus lens results in a focused beam size for this system of approximately 55 µm ($1/e^2$ definition) measured using a PRIMES beam profiling system. For all surface modification trials, laser power was varied while the wobble parameters remained constant such that the beam was translated in a clockwise circular path at a frequency of 606 Hz with a wobble amplitude of 1.3 mm. The travel speed of the wobble-manipulated beam was also held constant at 34 mm/s (80 in./min).

Tensile test specimens modified with an electron beam welding system that utilized a de-focused beam raster were also tensile tested and examined fractographically. Using a simple relationship based on beam travel speed and beam power, the overall heat input for the electron beam samples was approximately 4 times greater than the 500 W laser condition used.

Figure 1D:
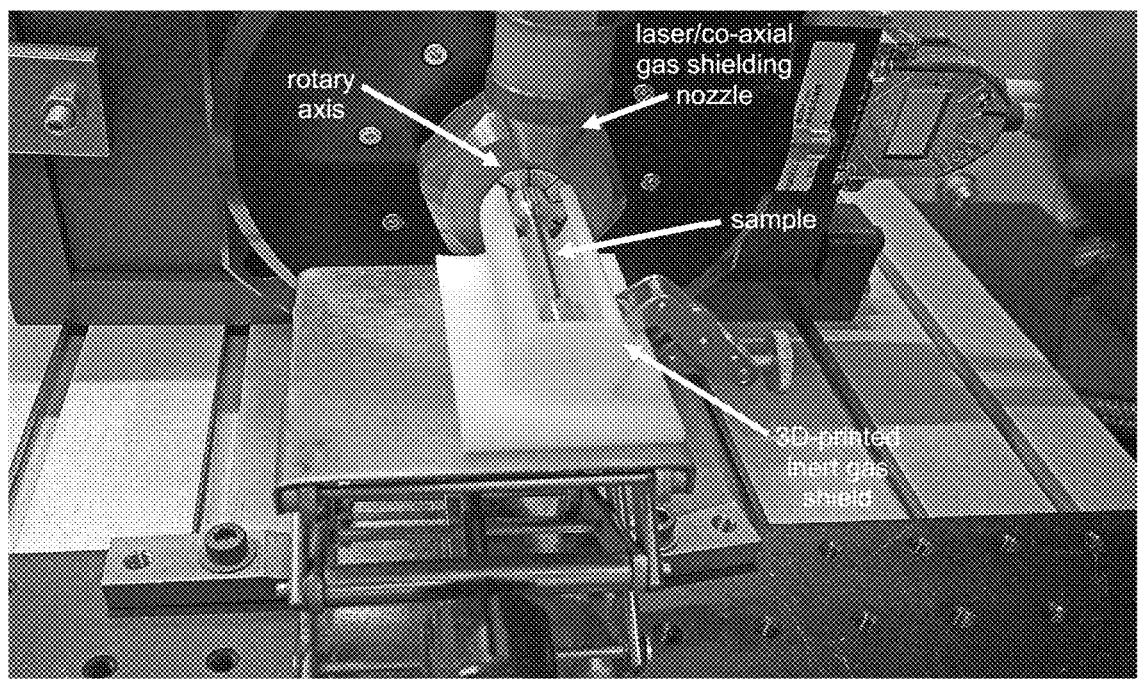

Translation of the workpiece relative to the beam was performed using pre-programmed CNC motion including a rotary axis for axisymmetric parts. FIG. 1D shows an example setup with a tensile sample prior to surface modification. The photograph shows the location of the shielding gas/laser nozzle relative to the part. The shielding gas nozzle delivers helium gas to the part surface. For certain part geometries, such as the tensile specimen shown in the FIG. 1D, a custom 3D-printed polymer shielding gas dam was fabricated to further reduce workpiece oxidation/discoloration resulting from processing.

Modified and unmodified Hiperco® cylindrical tensile test samples with a gauge section diameter of 6.35 mm were tested under quasistatic conditions at an approximate strain rate of 0.001 s$^{-1}$. Strain was measured using conventional extensometry over a gauge length of 25 mm. After fracture, care was taken to preserve the fracture surface for fractography using scanning electron microscopy (SEM). Electron beam surface modified tensile samples utilized non-contact extensometry to measure strain.

The magnetic properties were measured using a soft magnetic tester (SMT-700, KJS Associates, Indianapolis, IN) with an external magnetic yoke (YOKE-100, KJS Associates, Indianapolis, IN) able to test cylindrical bar-type specimens 15.9 mm in diameter by 102 mm long. Bar-type samples were evaluated because of the prohibitively complex CNC motion required to surface modify conventional ring-type magnetic test samples. Prior to testing, samples were dynamically demagnetized. Magnetization hysteresigraphs (B-H curves) were gathered up to a maximum applied field of 1000 Oe. Where possible, test conditions were selected to comply with ASTM A773. See ASTM A773/A773M-01, "Standard Test Method for dc Magnetic Properties of Materials Using Ring and Permeameter Procedures with dc Electronic Hysteresigraphs," ASTM International (West Conshohocken, PA), 2009.

Due to the shallow nature (e.g., <200 μm in depth) of the modified surface layer, microstructural characterization was performed using SEM backscatter channeling contrast imaging as well as electron backscatter diffraction (EBSD) on metallographically-prepared samples. EBSD data collected through Oxford/HKL software was used to generate inverse pole figure (IPF) maps. The step size used for EBSD analysis was 50 nm or 200 nm, depending on the area of the map.

Example 4: Analysis of Surface-Modified Samples

Figure 2:
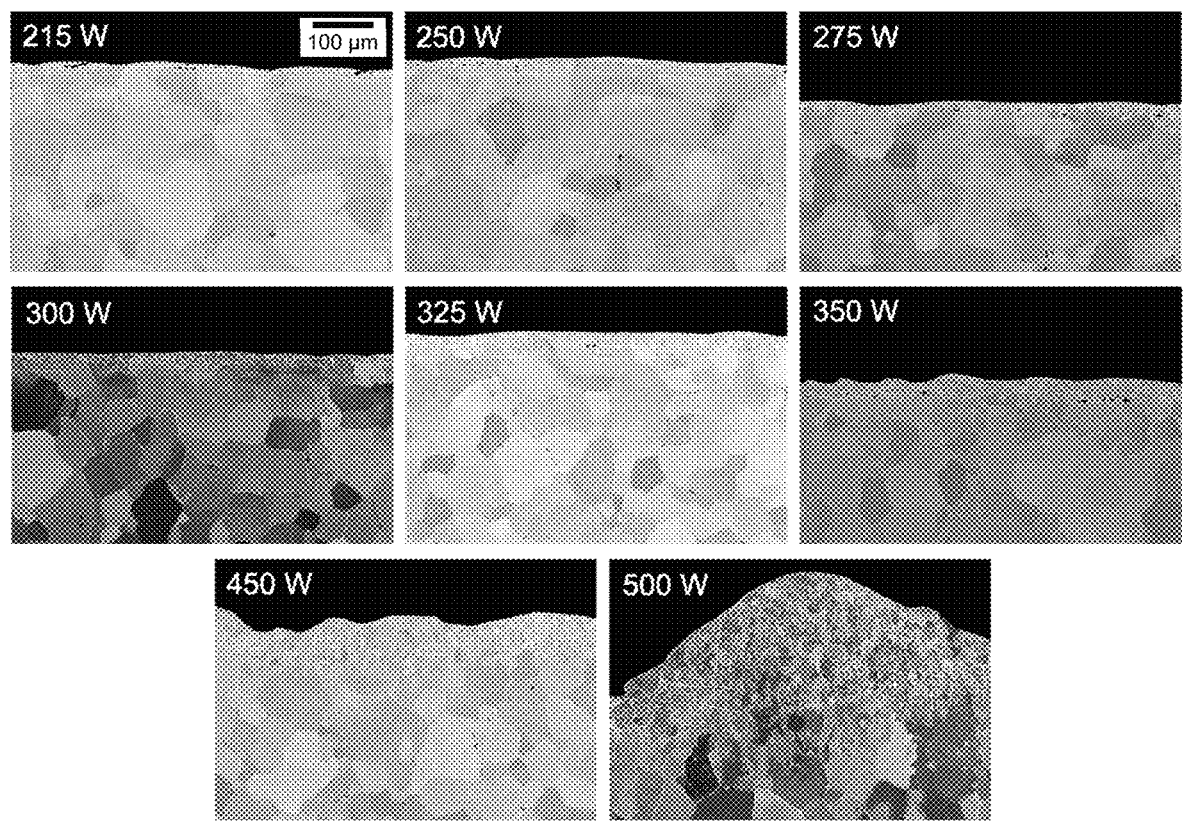
FIG. 2 shows backscatter electron channeling micrographs of transverse cross section through laser modified surface layer. Corresponding laser power for surface layer is shown on the micrograph.
Figure 3:
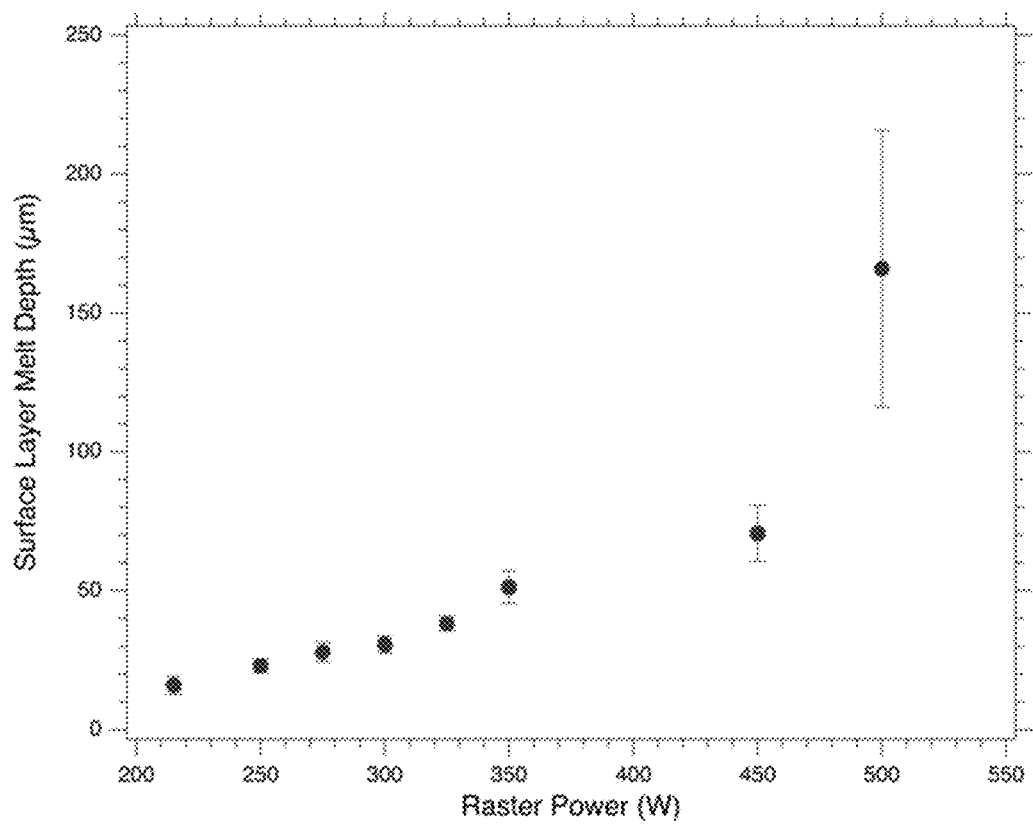
FIG. 3 is a graph of average measured surface layer melt depth as a function of applied laser power.

FIGS. 1A-1B shows photographs of a laser surface-modified tensile sample along with a detail photograph demonstrating the series of overlapping circular beam paths created by the wobble laser processing head. Backscatter electron channeling micrographs of metallographic sections transverse to the beam travel direction reveal a thin solidified layer on the surface of the part increasing in depth with delivered laser power (FIG. 2). The processed layer average depth ranged from 16 μm to 165 μm depending on the power setting (FIG. 3). The surface undulation or waviness observed in transverse cross section also appears to vary directly with laser power. The highest power setting evaluated (500 W) exhibited well-pronounced, alternating protrusions and depressions approximately 100 μm deep.

Figure 4:
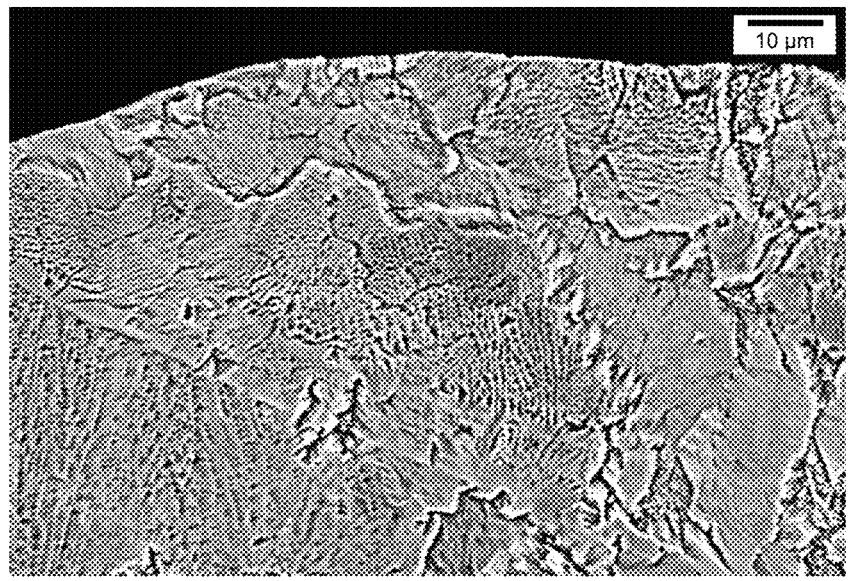
FIG. 4 shows a high-magnification backscatter electron image of surface layer solidification substructure resulting from 500 W laser melting.

While the backscatter electron channeling contrast images were able to provide information as to the geometry of the modified surface layer, microstructural details including solidified grain structure and solidification substructure information were often difficult to discern for all but the highest heat input (i.e., highest power) conditions explored. FIG. 4 is a high magnification SEM backscatter electron micrograph showing the solidification microstructure of the 500 W condition formed from via rapid solidification. Columnar and equiaxed solidification grains are visible containing cellular/cellular dendritic solidification substructure with a characteristic spacing between 0.5-1.0 μm. The overall solidification microstructure morphology is typical of single-phase solidification for an alloy solidifying as austenite, as is expected for Hiperco®.

Electron backscatter diffraction (EBSD) inverse pole figure (IPF) maps (FIG. 5) show the resultant microstructural changes associated with laser surface modification as a function of laser power. All parameter conditions explored demonstrate considerable grain refinement with respect to the 20-50 μm grains found in the unaffected Hiperco® parent material microstructure. The degree of grain refinement appears to increase with lower heat input conditions (i.e., lower power). The IPF map for the 215 W condition shows a large proportion of solidification grains 1 μm or finer. While there is evidence of epitaxial nucleation and growth of solidification grains near the melted layer fusion boundary, the modified surface layer does not completely inherit the parent grain orientation with much of the surface layer's crystallographic orientation appearing random for all power conditions examined.

Figure 6:
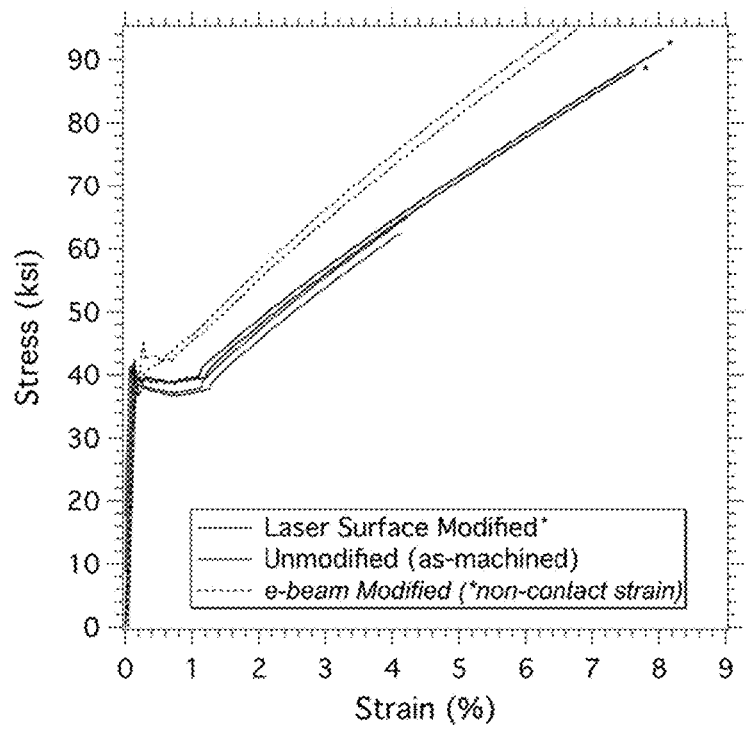
FIG. 6 shows tensile stress-strain data for a laser surface-modified sample (solid line, marked by an asterisk *), an unmodified sample (solid line), and an electron-beam modified sample (dashed line). Laser surface-modified Hiperco® was produced using the 250 W power setting.
Figure 7A:
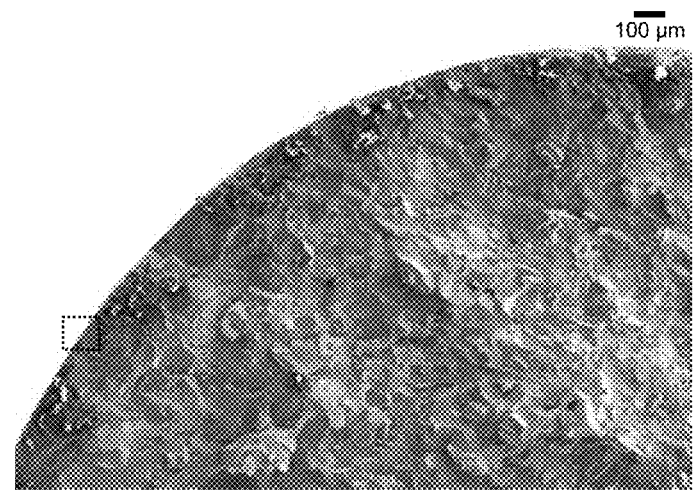
FIG. 7A shows a scanning electron microscopy (SEM) fractograph of unmodified Hiperco®.
Figure 7B:
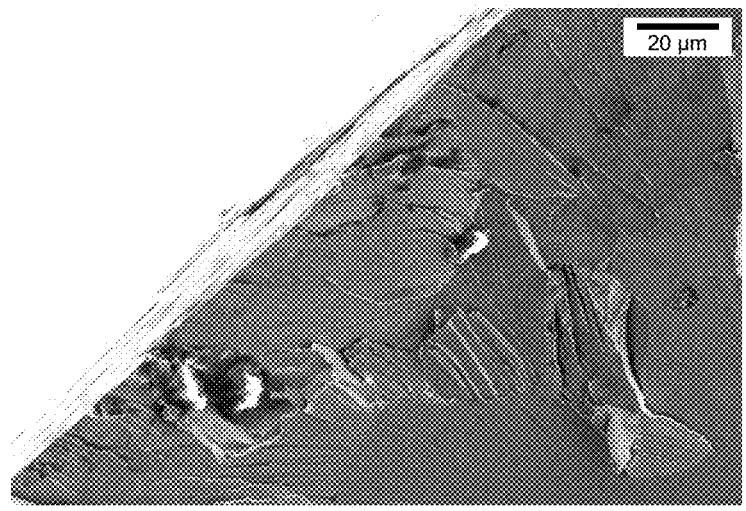
FIG. 7B shows a SEM fractograph of the region indicated by the dashed box in FIG. 7A.
Figure 7C:
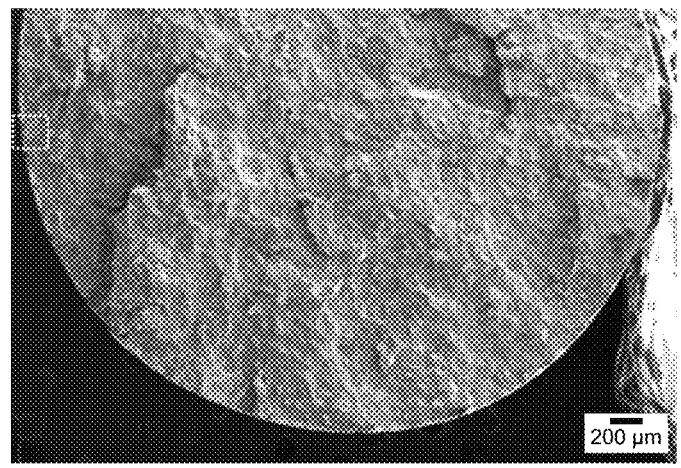
FIG. 7C shows a SEM fractograph of laser surface-modified Hiperco®.
Figure 7D:
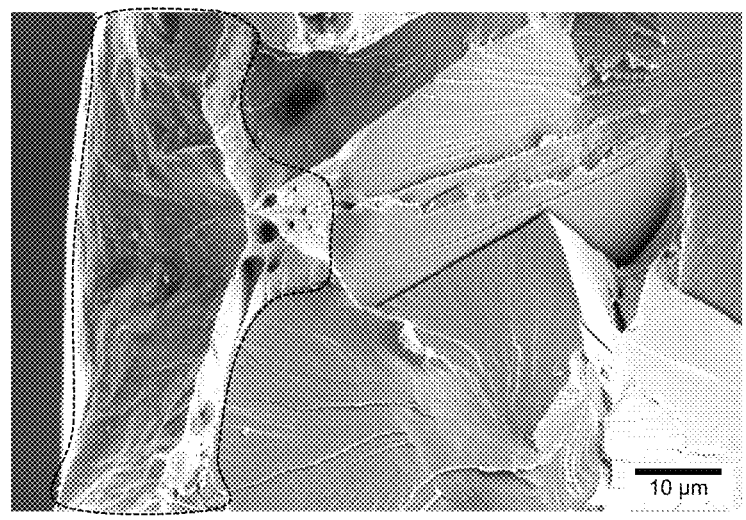
FIG. 7D shows a SEM fractograph of the region indicated by the dashed box in FIG. 7C, in which the ductile fracture region is indicated by a dashed line.
Figure 7E:
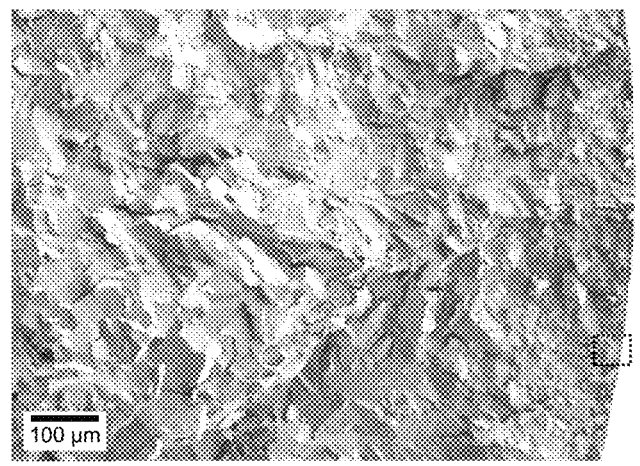
FIG. 7E shows a SEM fractograph of electron beam surface-modified Hiperco®.
Figure 7F:
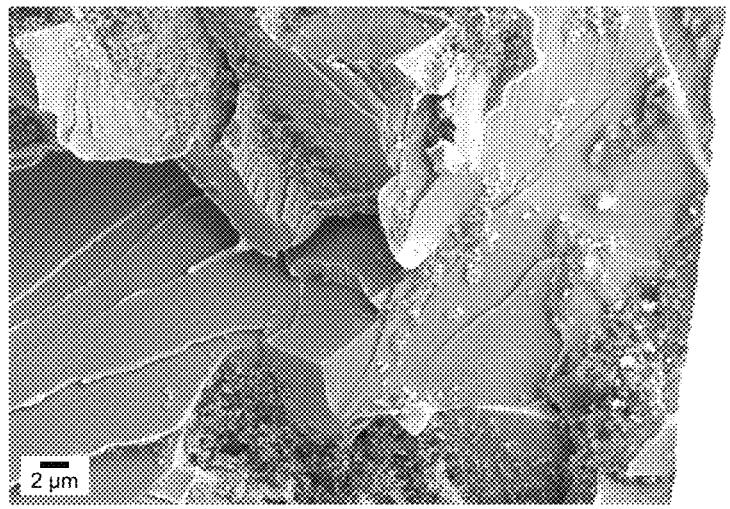
FIG. 7F shows a SEM fractograph of the region indicated by the dashed box in FIG. 7E.

FIG. 6 shows tensile stress-strain data for Hiperco® samples modified using the previously mentioned wobble parameters at an applied laser power of 250 W. Stress-strain data for unmodified samples of the same material subjected to the same heat treatment tested along with the surface modified samples are shown in the figure. The stress-strain data reveals the surface modified Hiperco® samples exhibit similar upper/lower yield point plastic deformation behavior which is characteristic of this alloy. See K. Kawahara, *J. Mater. Sci.* 18 (11), 3437 (1983). While the stress-strain data does not show appreciable difference in post-yield behavior including hardening rate, the most notable difference observed between the modified versus unmodified specimens is the nearly 100% increase in total strain to failure (i.e., ductility). Tensile strain to failure of near 8% observed for the modified samples is notable for this intermetallic alloy system.

An additional benefit related to the improved ductility is a nearly 50% increase in measured tensile strength. This increase in tensile strength is realized from the unique fracture behavior of Hiperco® in that specimen necking (i.e., a concentration of plastic strain in a small region near fracture in which a prominent decrease in sample cross sectional area of observed) does not occur. In essence, any improvement to Hiperco® strain to failure will result in a corresponding increase in tensile strength.

Also shown in FIG. 6 are stress-strain data for the electron-beam modified samples which show similar strain-to-failure as the laser modified samples, albeit with slightly increased yield strength and work hardening rate. It should be noted that the method for measuring strain for the electron-beam specimens utilized non-contact laser extensometry versus conventional contact extensometry used for the laser and un-modified specimens. Internal data to date has shown that non-contact extensometry for Hiperco® test samples results in higher ductility values versus contact extensometry due to the interaction of the contact extensometer knife edge with the surface of Hiperco®. As a result, the strain-to-failure values (and tensile strength) using the non-contact method will be comparatively higher compared to conventional extensometry. Consequently, without additional data it may be difficult to quantitatively ascertain the efficacy of electron beam surface modification relative to the laser method as well as the unmodified condition based on tensile data alone.

Following tensile testing, fractography was performed in the SEM to investigate microscopic fracture features. FIGS. 7A-7F show fracture surfaces for modified and unmodified Hiperco® tensile samples. Overall, the fracture surfaces for all samples examined show brittle trans-/intergranular cleavage fracture features. Such fractographic characteristics are expected with Hiperco® in the annealed condition. Closer examination near the outermost edge of the laser surface modified sample reveals the presence of ductile shear and microvoid fracture features approximately 10-20 µm from the edge. The observation of any ductile fracture features for Hiperco® is noteworthy given this fracture mode has never been observed for material thermally processed for component use. When examining the corresponding region of the unmodified sample, there is no evidence of ductile fracture—brittle cleavage fracture features persist out to the very edge of the fracture. Similarly, examination of the electron beam-modified specimen fracture surfaces does not show evidence of ductile fracture within the processed region. For the electron beam process parameters used, brittle cleavage fracture features are visible to the outermost edge of the sample as was observed for the unmodified condition.

Figure 8:
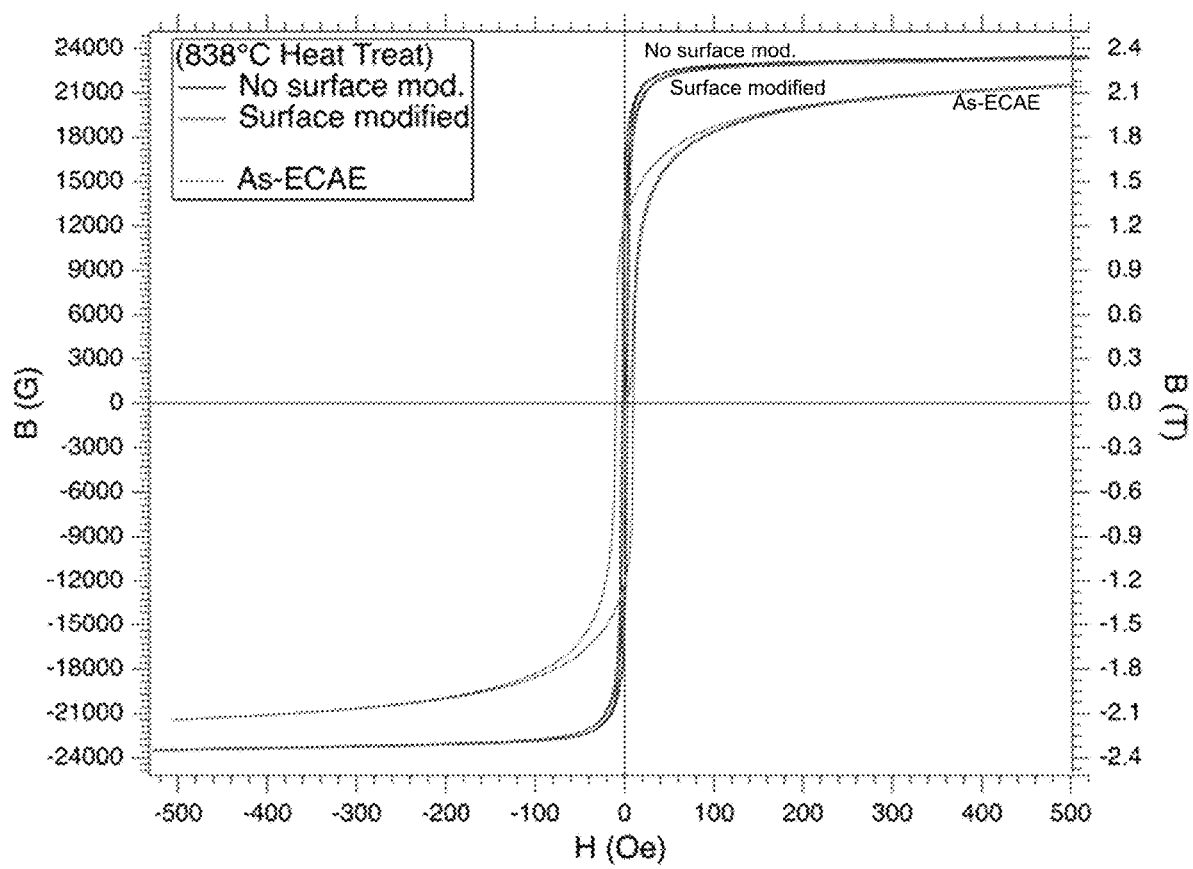
FIG. 8 shows the measured B-H loop for various Hiperco® conditions, including surface-modified Hiperco® (dashed line), as-ECAE Hiperco® (dark gray line), and unmodified Hiperco® (black line).

FIG. 8 shows DC magnetization hysteresigraphs (B-H curves) obtained for bar-type samples with laser surface modification and without modification. The unmodified sample was heat treated prior to magnetic testing using the annealing practice described earlier. The same annealing heat treatment was applied to the surface modified magnetic test sample prior to laser surface modification. Both samples exhibit very similar B-H characteristics desirable for solenoid and actuator applications. In other words, the material saturates with only small applied field (<100 Oe). Negligible change to the measured coercivity (Hc) was measured for the surface modified samples compared to unmodified: 2.92 versus 2.79 Oe, respectively. Also shown on the plot is data for Hiperco® in the as-ECAE condition reproduced from Susan. See D. Susan et al., "ECAE of Hiperco soft magnetic alloy," *Sandia Report No. SAND2016-10630PE*, 2016 (27 pp.). The B-H curve for the as-ECAE Hiperco® does not demonstrate magnetic behavior as 'soft' as the surface modified Hiperco®. As-ECAE material requires significantly higher applied magnetic field to reach comparable saturation values compared to surface modified Hiperco®. Furthermore, as-ECAE Hiperco® exhibits a greater B-H hysteresis including measured He of 9.79 Oe.

Example 5: Further Discussion of Exemplary Methods Described Herein

The present study examined the feasibility of a site-specific method via laser surface melting to improve characteristically poor Hiperco® mechanical properties while preserving desirable soft magnetic properties for solenoid and actuator components. The observations presented in the previous section suggest the surface modification technique explored resulted in tensile strength improvements with preservation of magnetic properties through microstructural refinement and circumvention of long-range atomic order afforded by the highly non-equilibrium solidification and cooling via laser melting.

Figure 5:
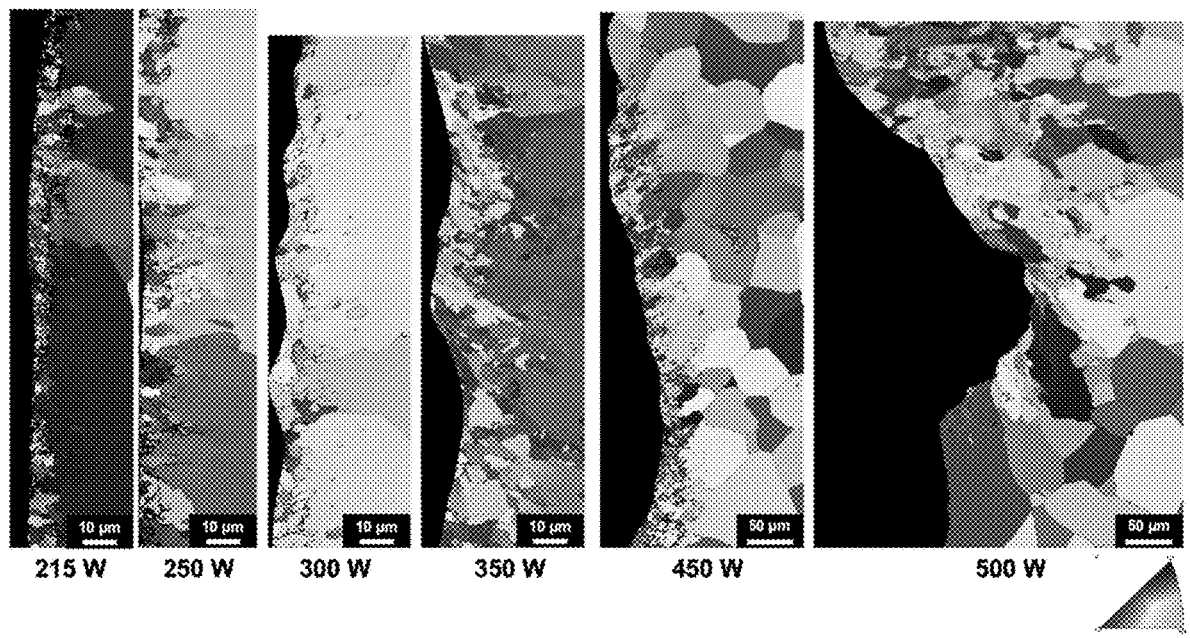
FIG. 5 shows electron backscatter diffraction (EBSD) inverse pole figure (IPF) (Z) maps for surface modified samples as a function of applied laser power.

The grain refinement produced by rapid melting and solidification shown in FIG. 2 and FIG. 5 is mechanistically similar to the grain refinement observed by Babuska et al. in the microstructures of AM PBF FeCo and Kustas et al. in AM DED FeCo1.5V. See T. F. Babuska et al., *Acta Mater.* 180, 149 (2019); and A. B. Kustas et al., *Additive Manufact.* 21, 41 (2018). In both studies the authors note fine micron-sized grains similar in size to grains produced with the lower power settings described herein (≤300 W). While both studies mentioned previously discuss the impact of increased strength from refined grains via Hall Petch strengthening, the more impactful observation relative to the current surface modification work is the observation of ductile fracture with necking (FIGS. 7A-7F) as also observed by Babuska et al. The authors propose that sufficiently high cooling rates ($\geq 10^{3\circ}$ C./s) were achieved during the AM PBF process to prevent long-range ordering which would otherwise result in brittle fracture characteristics. Cooling rate during the surface modification process described herein was not directly measured; however, microstructural examination of the modified surface layer solidification substructure does provide insight into operative cooling rate. The characteristic cell spacing of the 500 W condition shown in FIG. 4 is similar in scale to the ~500 nm cell spacing reported in Babuska et al.'s study. While it was not determined directly, the lower heat input surface modification parameters (including the 250 W parameter condition used for tensile and magnetic testing) are expected to have a comparatively finer solidification substructure due to faster cooling relative to the 500 W condition in FIG. 4.

The degree of atomic ordering present in the modified surface layer was not directly characterized; however, indirect evidence of atomic disorder was confirmed via the observation of ductile fracture within the laser processed region as shown in FIGS. 7A-7F. Ductile stress-strain behavior for Hiperco® is only observed in the atomically disordered condition in which dislocation movement does not require the coordinated movement of dislocation pairs through the ordered B2 lattice. See N. S. Stoloff et al., *Acta Metallurg.* 12 (5), 473 (1964).

According to the invention, the atomically disordered layer is expected to be beneficial because of its ability to deform and blunt any surface defect/stress risers (e.g., nick or scratch) as is the case for conventional, disordered engineering alloys without notch sensitivity. While there was no direct assessment of microstructure for the electron beam modified tensile samples, the lack of microscopic ductile features decorating the periphery of the fracture surface provides indirect evidence that long-range atomic order was not precluded for the electron beam parameters used. It is presumed that the cooling rate achieved with the electron beam parameters was not able to exceed the critical rate needed (~$\geq 10^{3\circ}$ c./s) necessary to avoid ordering in FeCo. See D. W. Clegg et al., *Metal Sci. J.* 7 (1), 48 (1973).

The microstructure produced from laser surface modification of Hiperco® is mechanistically similar to metal AM processing and produces grain refinement on par with ECAE. In that manner, it is expected based on published studies that the magnetic behavior of such microstructures will not be as ideal comparatively for solenoid/actuator applications as heat treated Hiperco® produced by conventional thermomechanical processing. See T. F. Babuska et al., *Acta Mater.* 180, 149 (2019); and A. B. Kustas et al., *Additive Manufact.* 21, 41 (2018). The similar B-H loop characteristics measured for both laser-modified and unmodified Hiperco® (FIG. 8) suggests the bulk magnetic properties were minimally affected by surface modification due to the volume of the modified layer being relatively small compared to the overall part volume. For the test samples measured, the laser processed surface layer represents only 0.3% of the total volume of the bar-type sample magnetically tested. For parameters with deeper melted layer depths (i.e., higher process parameter heat input) or for smaller parts, the relative fraction of the processed layer volume with respect to total part volume will increase. As a result, the magnetic properties may be proportionally diminished.

Overall, the surface modification technique as applied to Hiperco® 50A shows promise for improving mechanical properties by precluding surface-defect nucleated fracture while preserving the bulk microstructure away from the surface. With some laser equipment development, it is expected that this technique could be applied to complex geometry electromagnetic assemblies without much difficulty. The improvement in mechanical properties and damage tolerance from surface modification will result in increased design margins for Hiperco® in demanding environments.

Additionally, the surface modification techniques of the invention can also be applied to other ordered intermetallic alloy systems, provided favorable solidification behavior is observed. For example, high-silicon content core iron could be surface processed to produce a disordered surface layer while preserving the ordered B2 or DO3 crystal structure away from the surface.

Figure 9A:
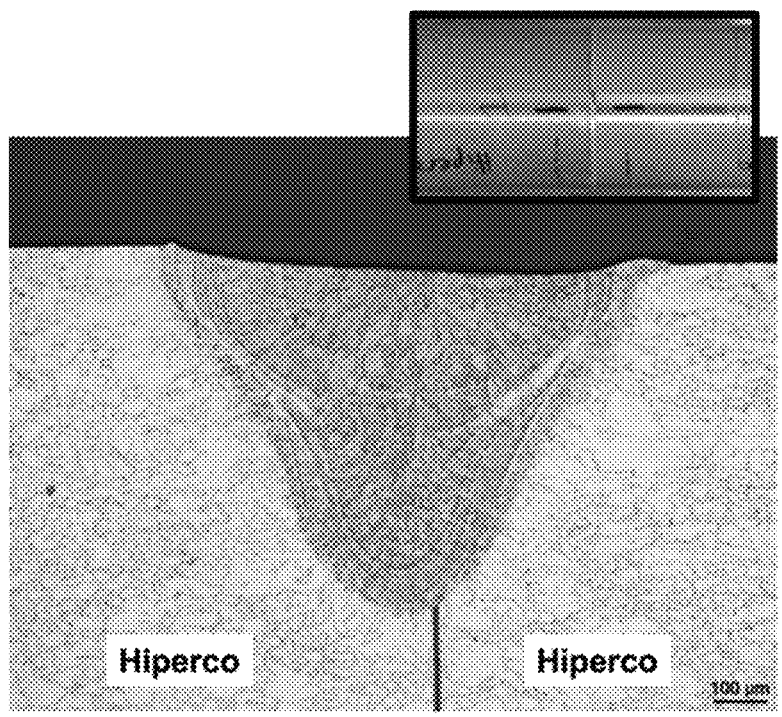
FIG. 9A is an optical micrograph of laser weld between two components composed of soft magnetic alloys, such as a first component of Hiperco® 50A to a second component of Hiperco® 50A.
Figure 9B:
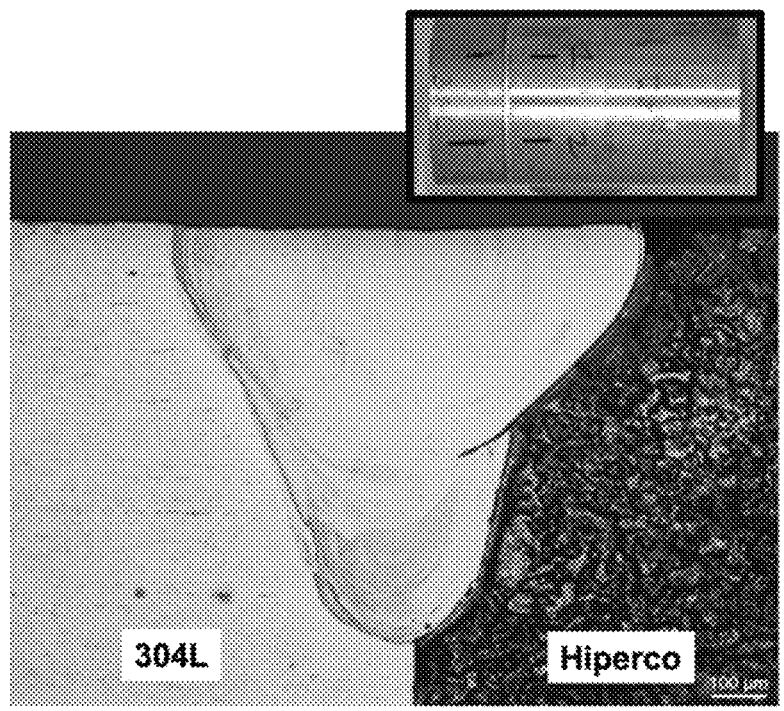
FIG. 9B is an optical micrograph of a laser weld between a first component composed of a soft magnetic alloy (e.g., Hiperco® 50A) to a second component composed of a metal (e.g., a hard metal, such as stainless steel 304L).

Another outcome of this fusion-based surface modification work is the demonstration of Hiperco® weldability with high-energy density processing. Historically, Hiperco® has not been utilized in component designs with welds. The same mechanism that results in the prevention of long-range order is also likely operative in high-energy density welding given high cooling rates are to be expected. As a feasibility exercise, continuous wave laser welds were created for similar alloy and dissimilar alloy Hiperco® welds. FIGS. 9A-9B shows metallographic sections of laser welds produced demonstrating feasibility. The ability to fusion weld Hiperco® using a laser process may open new design possibilities.

Lastly, the ability to create location-specific fine-grained, disordered surface layers has other benefits in addition to improvements in magnetic component robustness (e.g., improvements for fracture toughness). Obtaining valid fracture toughness data for Hiperco® has been challenging due to the inability to grow requisite stable fatigue pre-crack. FIGS. 10A-10E shows a V-notch flexural fracture toughness test specimen that was laser surface modified within the notch to create a ~200 µm region of disordered microstructure. The mechanical properties of this disordered laser surface modified region were such that a stable fatigue crack was able to propagate and extend for approximately 250,000 cycles prior to the unstable extension of the crack through the unmodified bulk Hiperco® microstructure.

Figure 10A:
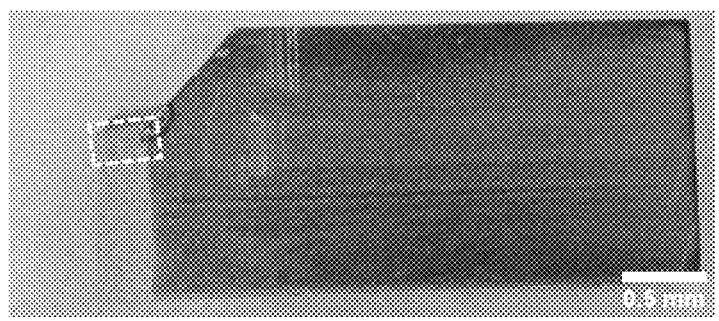
FIGS. 10A-10E shows laser surface-modified Hiperco® V-notch fracture toughness test sample demonstrating stable fatigue pre-crack growth within processed region. The sample was loaded to ~250,000 cycles prior to final fracture.
Figure 10B:
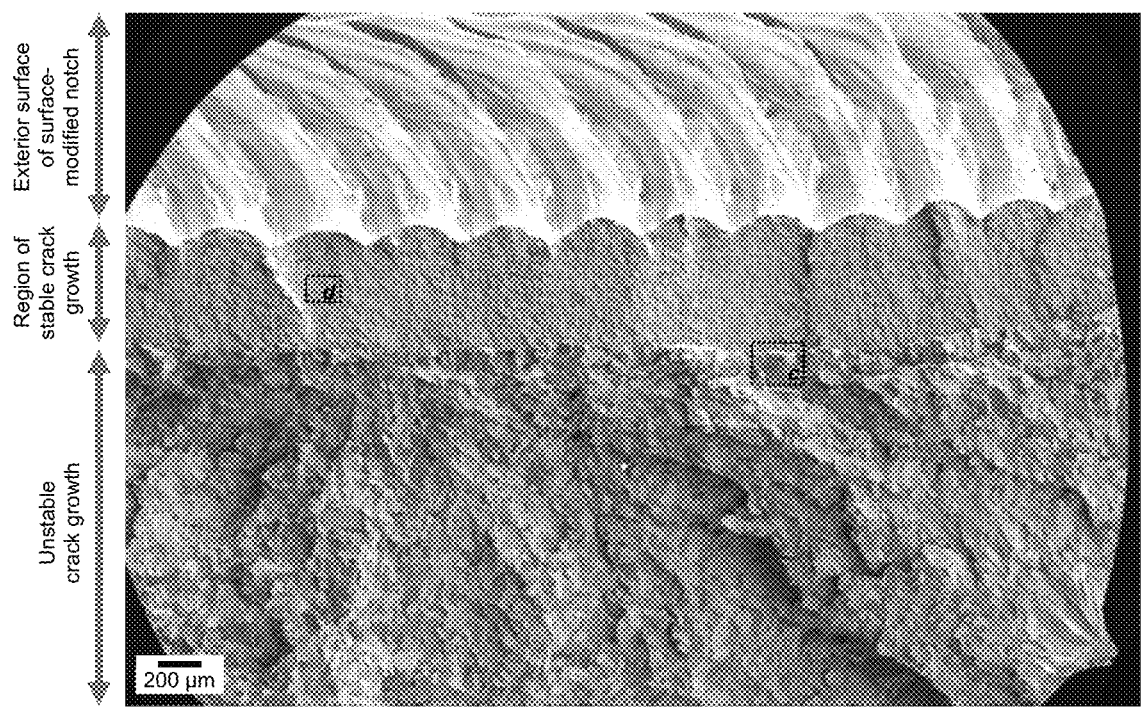
Figure 10C:
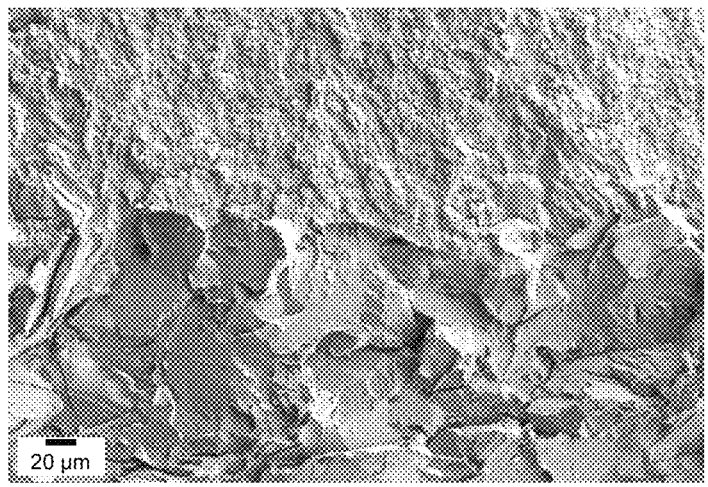
Figure 10D:
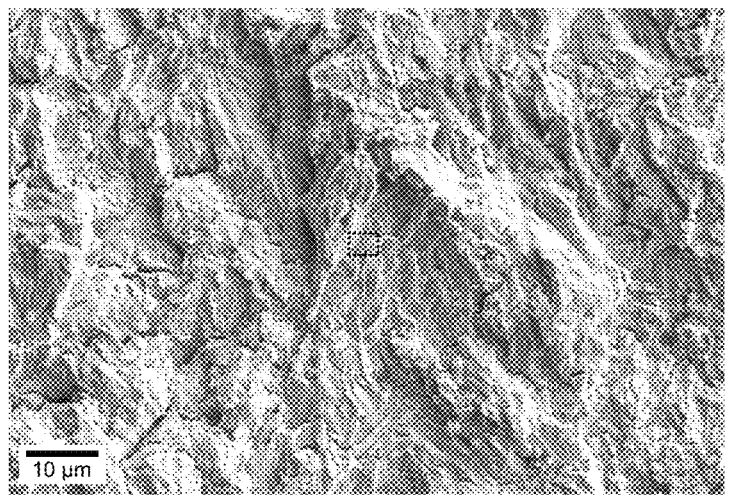
Figure 10E:
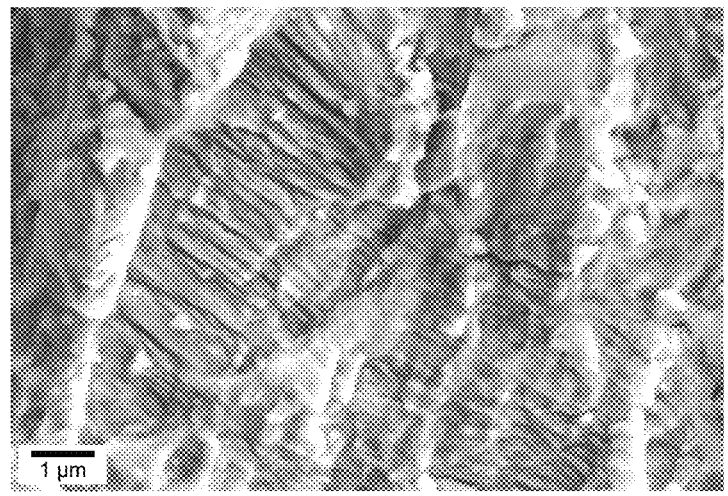

The fracture surface shown in FIG. 10B within the surface modified notch shows prototypical fatigue striations throughout the stable crack growth region with the brittle cleavage fracture associated with unstable crack growth through the unmodified parent microstructure. The formation of stable crack growth features in Hiperco® is noteworthy as this has not been observed to-date for conventionally processed material.

In summary, the surface-based method can be used to modify Hiperco® (FeCo2V) and other soft magnetic alloys resulting in a measured improvement to tensile properties without significant degradation in soft magnetic properties. Electron microscopy and electron backscatter diffraction of the surface modified layers indicated the strength improvement was due to a combination of grain refinement from rapid solidification combined with atomic disorder from rapid cooling after solidification. Laser surface melting demonstrated a change in observed fracture behavior with surface modified Hiperco® samples demonstrating evidence of ductile rupture within the processed layer. This fracture morphology is unique and provides indirect evidence that the surface modification technique is able to produce local atomic disorder by rapid cooling after solidification. The combination of surface refinement with creation of local regions of atomic disorder is thought to delay the onset of surface defect-nucleated fracture in Hiperco®, thereby resulting in the measured improvement in both material ductility and strength of 100% and 50%, respectively.

The invention has direct applicability to magnetic components (e.g., solenoid and actuator parts). Additional equipment development can be expanded to process to parts with complex geometries. Outside of magnetic components, surface modification of Hiperco® was also shown to enable mechanical property improvements, such as fracture toughness. Stable fatigue pre-crack growth propagating through a laser surface modified Hiperco® microstructure was observed for the first time.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:
1. A method comprising:
providing a component comprising a soft magnetic alloy with a crystal structure having long-range atomic order; and
treating a surface portion of the component with a high energy beam, thereby melting and solidifying the surface portion to provide a treated surface portion, wherein the treated surface portion comprises a disordered surface layer having a grain size less than about 10 µm in size and a thickness of between 10 µm and 300 µm.
2. The method of claim 1, wherein the soft magnetic alloy comprises iron and cobalt.
3. The method of claim 1, wherein the high energy beam comprises a laser beam or an electron beam.
4. The method of claim 3, wherein the laser beam comprises a wavelength of from about 1000 nm to about 1200 nm.
5. The method of claim 3, wherein the laser beam comprises a continuous wave laser beam.
6. The method of claim 1, wherein the high energy beam comprises a power of from about 200 W to about 500 W.
7. The method of claim 1, wherein the high energy beam comprises a frequency oscillation of from about 250 Hz to 1 kHz.
8. The method of claim 1, wherein the high energy beam is translated along a wobble path.
9. The method of claim 1, wherein the high energy beam comprises a focused beam size of from about 20 µm to about 80 µm.
10. The method of claim 1, wherein the solidifying comprises cooling at a rate of from about 500° C./see to about 5000° C./sec.

11. The method of claim 1, wherein the treated surface portion comprises at least about 80% increase in tensile strain-to-failure, as compared to the surface portion prior to treatment.

12. The method of claim 1, wherein the treated surface portion comprises at least about 30% increase in tensile strength, as compared to the surface portion prior to treatment.

13. The method of claim 1, wherein the component comprises a solenoid, an actuator, a tape core, a magnetic core, a rotor, a stator, a magnetic bearing, a motor, or a generator.

14. The method of claim 1, wherein the crystal structure having long-range atomic order comprises an ordered B2 or DO3 crystal structure.

* * * * *